(12) United States Patent
McMullan

(10) Patent No.: US 11,739,692 B2
(45) Date of Patent: Aug. 29, 2023

(54) ELECTRONIC ENGINE CONTROLLER

(71) Applicant: ROLLS-ROYCE plc, London (GB)

(72) Inventor: Ken McMullan, Belfast (GB)

(73) Assignee: Rolls-Royce plc, London (GB)

( * ) Notice: Subject to any disclaimer, the term of this patent is extended or adjusted under 35 U.S.C. 154(b) by 178 days.

(21) Appl. No.: 17/065,813

(22) Filed: Oct. 8, 2020

(65) Prior Publication Data

US 2021/0222634 A1 Jul. 22, 2021

(30) Foreign Application Priority Data

Oct. 15, 2019 (GB) ...................................... 1914887

(51) Int. Cl.
*F02C 7/232* (2006.01)

(52) U.S. Cl.
CPC ........ *F02C 7/232* (2013.01); *F05D 2220/323* (2013.01); *F05D 2270/05* (2013.01)

(58) Field of Classification Search
CPC ................. F02C 7/232; F16K 31/0041; F16K 31/06–0696
USPC .......................... 137/554; 251/129.15–129.22
See application file for complete search history.

(56) References Cited

U.S. PATENT DOCUMENTS

| | | | |
|---|---|---|---|
| 4,809,742 A | 3/1989 | Grau | |
| 4,995,586 A | 2/1991 | Gensberger et al. | |
| 6,377,008 B1 | 4/2002 | Hirata | |
| 6,724,606 B2 | 4/2004 | Seale et al. | |
| 6,788,024 B2 | 9/2004 | Kaneko et al. | |
| 7,612,978 B2 | 11/2009 | Bergstrom et al. | |
| 8,879,231 B2 | 11/2014 | Katzschmann et al. | |
| 9,343,218 B2 | 5/2016 | Lamprell | |

(Continued)

FOREIGN PATENT DOCUMENTS

| | | |
|---|---|---|
| EP | 0067298 | 12/1982 |
| EP | 2216792 A2 | 8/2010 |

(Continued)

OTHER PUBLICATIONS

Great Britain search report dated Apr. 14, 2020, issued in GB Patent Application No. 1914887.3.

(Continued)

*Primary Examiner* — Katheryn A Malatek
(74) *Attorney, Agent, or Firm* — Shumaker & Sieffert, P.A.

(57) ABSTRACT

An Electronic Engine Controller (EEC) for a gas turbine engine. The EEC is configured to be connected to a solenoid valve, and configured to control the solenoid valve by providing a driving signal to either a first solenoid winding or a second solenoid winding of the solenoid valve, the first and second solenoid windings being magnetically coupled to one another by an armature of the solenoid valve. The armature is movable under the action of the driving signal to operate the solenoid valve. The solenoid winding of the first and second solenoid windings provided with the driving signal is a driving winding and the other solenoid winding of the first and second solenoid windings is a pick-up winding. When the EEC controls the solenoid valve via the driving winding by providing the driving signal thereto, it is further configured to sense a position of the solenoid valve via the pick-up winding by detecting a signal induced in the pick-up winding by the magnetic coupling.

9 Claims, 3 Drawing Sheets

(56) References Cited

U.S. PATENT DOCUMENTS

| | | |
|---|---|---|
| 9,602,032 B2 | 3/2017 | Kim et al. |
| 9,765,468 B2 | 9/2017 | Kim et al. |
| 2001/0043450 A1 | 11/2001 | Seale et al. |
| 2002/0047707 A1 | 4/2002 | Schmidt |
| 2003/0098686 A1* | 5/2003 | Mednikov ............ F01L 9/20 324/207.21 |
| 2003/0169552 A1 | 9/2003 | Seale et al. |
| 2006/0125467 A1* | 6/2006 | Berton ............ G01R 19/0023 324/76.11 |
| 2007/0242408 A1 | 10/2007 | Bergstrom et al. |
| 2010/0201375 A1* | 8/2010 | Walker ............ G01R 31/72 702/58 |
| 2011/0038091 A1 | 2/2011 | Katzschmann et al. |
| 2012/0181959 A1 | 7/2012 | Otokawa et al. |
| 2012/0200244 A1 | 8/2012 | Otokawa et al. |
| 2014/0117911 A1 | 5/2014 | Lamprell |
| 2015/0128662 A1 | 5/2015 | Kim et al. |
| 2015/0377918 A1* | 12/2015 | Waters ............ G01P 15/0802 73/514.32 |
| 2016/0094167 A1 | 3/2016 | Kim et al. |
| 2019/0072041 A1* | 3/2019 | Cabello ............ F02C 9/263 |

FOREIGN PATENT DOCUMENTS

| | | |
|---|---|---|
| EP | 3388792 A1 | 10/2018 |
| JP | H10115205 | 5/1998 |

OTHER PUBLICATIONS

European search report dated Feb. 8, 2021, issued in EP patent application No. 20196141.

Response to Extended Search Report dated Feb. 19, 2021 from counterpart European Application No. 20196141.4, filed Oct. 20, 2021, 47 pp.

* cited by examiner

ELECTRONIC ENGINE CONTROLLER

CROSS-REFERENCE TO RELATED APPLICATIONS

This specification is based upon and claims the benefit of priority from UK Patent Application Number GB1914887.3 filed on 15 Oct. 2019, the entire contents of which are incorporated herein by reference.

BACKGROUND

Technical Field

The present disclosure relates to an electronic engine controller (EEC), for example for use in a gas turbine engine.

Description of the Related Art

Electronic engine controllers are used to provide control over components of, for example, a gas turbine engine. The EEC receives information from sensors embedded in the gas turbine engine, and can either automatically control components of the gas turbine engine (e.g. fuel mix, throttle position etc.) based on these readings, or provide these readings to a user (e.g. pilot) who can then control the engine based on the sensor information.

Near-future gas turbine engines will contain a large number of valves. Presently, the valves are typically implemented as solenoid valves. A solenoid valve, at its most basic, includes a winding and an armature which is magnetically coupled to the winding. The sending of a driving signal to the winding causes the armature to move, thereby opening/closing the valve.

It is important that the valve position is accurately known, so that the EEC or user can make decisions relating to the operation of the engine. Typically, linear variable differential transducers (LVDTs) and/or proximity sensors are used to monitor the position of the armature in the solenoid valve. An LVDT has three windings, one which is used to generate a magnetic "excitation", and two which are used to sense the position of the armature. An LVDT therefore requires six wires, two for each winding. This would be over and above the pair of wires required for the solenoid itself.

Where the solenoid valve is in a safety critical location (e.g. a fuel line in an aerospace gas turbine engine) it may be that two independent driving channels and two independent monitoring channels are required. For example, a full authority digital engine controller (FADCEC) will often have two channels which can be used, independently, to control aspects of the gas turbine engine. In such a case, the number of wires is doubled from eight to sixteen. This increases both the complexity of the wiring and the weight of the resulting sensor. Moreover, any wiring connections to and from the solenoid valve may require sealing, which can leave a potential leakage path for the fluid being controlled by the valve.

SUMMARY

The present disclosure provides an electronic engine controller (EEC), a combination of an electronic engine controller and a solenoid valve connected thereto, a gas turbine engine, and a method of controlling a solenoid valve in a gas turbine engine by an electronic engine controller, as set out in the appended claims.

According to a first aspect there is provided an electronic engine controller (EEC), for a gas turbine engine, wherein the EEC is configured to be connected to a solenoid valve, and configured to control the solenoid valve by providing a driving signal to either a first solenoid winding or a second solenoid winding of the solenoid valve, the first and second solenoid windings being magnetically coupled to one another by an armature of the solenoid valve; wherein the armature is movable under the action of the driving signal to operate the solenoid valve; the solenoid winding of the first and second solenoid windings provided with the driving signal is a driving winding and the other solenoid winding of the first and second solenoid windings is a pick-up winding; and wherein, when the EEC controls the solenoid valve via the driving winding by providing the driving signal thereto, it is further configured to sense a position of the solenoid valve via the pick-up winding by detecting a signal induced in the pick-up winding by the magnetic coupling.

Advantageously, where a solenoid valve contains two solenoid windings for the purposes of redundancy, one of these can be used as a sensor. As the first and second solenoid windings are magnetically coupled via the armature, the signal provided to the first causes a signal to be induced in the second.

Optional features of the present disclosure will now be set out. These are applicable singly or in any combination with any aspect of the present disclosure.

The EEC may be configured to control the solenoid valve via either the first solenoid winding or the second solenoid winding separately, that is the EEC controls only one of the first solenoid winding and the second solenoid winding at any given time.

The EEC may be configured to control the driving winding via a pulse width modulated driving signal.

The EEC may be configured to sense a position of the solenoid valve based on an amplitude of the signal induced in the pick-up winding.

The EEC may be configured to sense a position of the solenoid valve based on a comparison between a first area under the driving signal provided to the driving winding, and a second area under the signal induced in the pick-up winding. The EEC may be configured to begin measuring the first area and the second area at a same time. The comparison between the first area and the second area may be the determination of a ratio of the first area to the second area.

The EEC may be a full authority digital engine controller, FADEC. The FADEC may be configured to control the first solenoid winding via a first channel, and the second solenoid winding via the second channel. The first channel and the second channel may be completely independent.

The EEC may be configured to control the driving winding via a square-wave driving signal.

In a second aspect, there is provided a combination of the EEC of the first aspect and the solenoid valve connected thereto.

The solenoid valve may be configured to control the flow of fuel into a combustion chamber of the gas turbine engine.

In a third aspect, there is provided a gas turbine engine for an aircraft including the EEC and solenoid valve of the second aspect.

In a fourth aspect, there is provided a method of controlling a solenoid valve in a gas turbine engine by an electronic engine controller, the solenoid valve including a first solenoid winding and a second solenoid winding which are magnetically coupled to one another by an armature of the solenoid valve, the method comprising the steps of: providing, to one of the first solenoid winding and the second solenoid winding, a driving signal to move the armature and thereby operate the solenoid valve; and sensing, from a signal induced in the other winding of the first solenoid winding and the second solenoid winding by the magnetic coupling, the position of the armature As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely byway of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds), for example in the range of from 80 Nkg-1s to 100 Nkg-1s, or 85 Nkg-1s to 95 Nkg-1s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
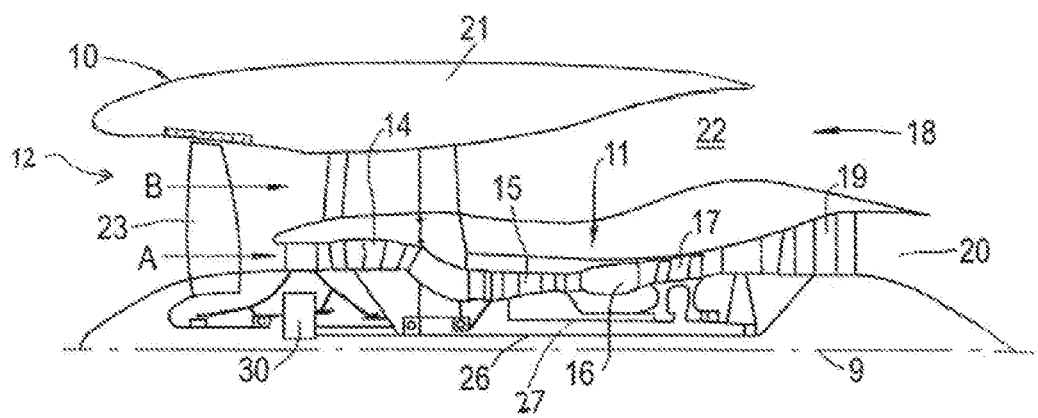
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
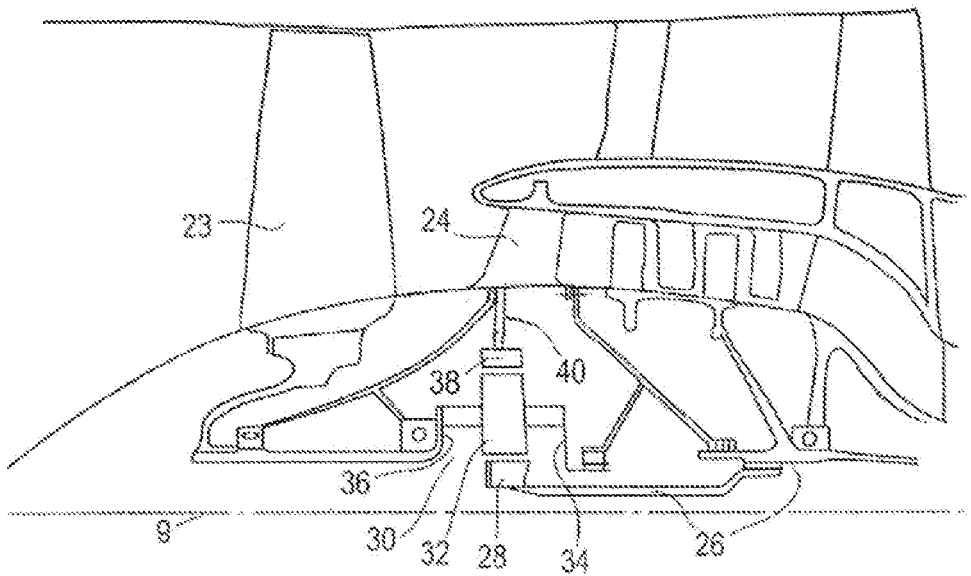
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
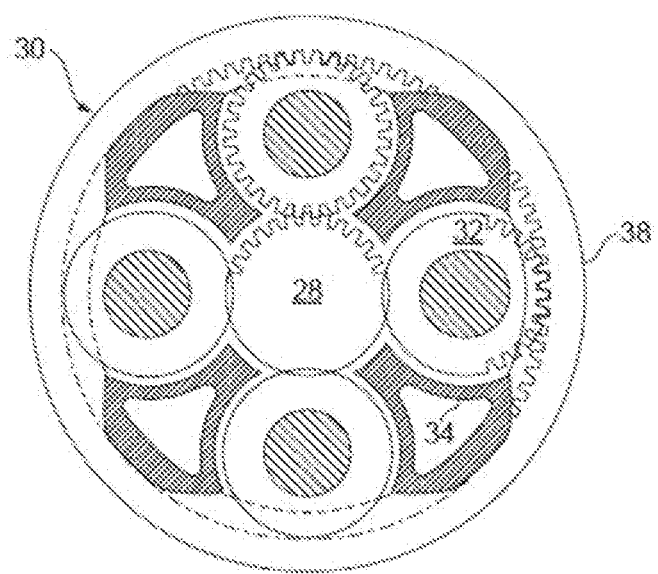
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
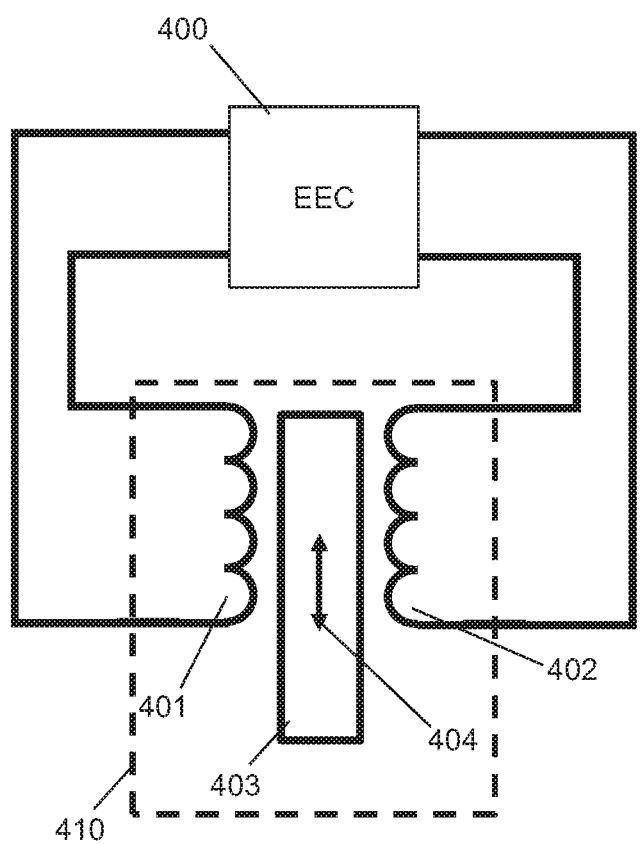
FIG. 4 is a schematic of a solenoid valve and EEC according to the present disclosure.

FIG. 4 is schematic view of an electronic engine controller, EEC, 400 according to the present disclosure. The EEC is connected, via separate channels, to a solenoid valve 410 containing a first solenoid winding 401 and a second solenoid winding 402. The windings are magnetically coupled by armature 403. In response to a driving signal, provided to either of the solenoid windings, the armature 403 moves in direction 404 so as to open or close a valve. The solenoid winding to which a driving signal is provided is referred to as the driving winding. The solenoid winding which is not receiving a driving signal is referred to as the pick-up winding.

Figure 5A:
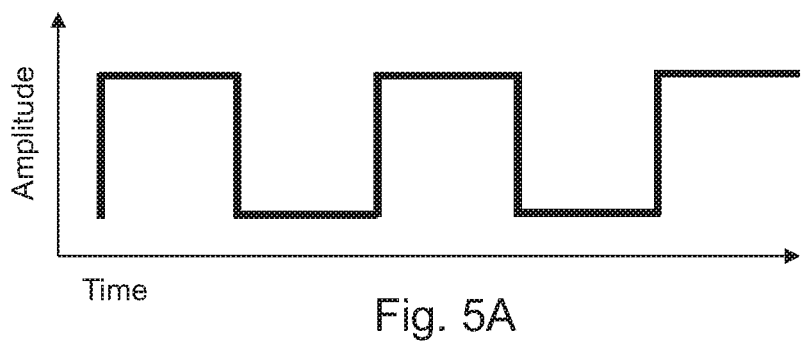
FIG. 5A is a plot of amplitude against time of a driving signal provided to a driving solenoid winding.

FIG. 5A shows a plot of amplitude against time for a driving signal provided to the driving winding of the two windings, the other winding being the pick-up winding. As has been discussed previously, the driving winding can be either of the first and second solenoid windings. The driving signal is a pulse width modulated signal, and has a square wave form. The use of a pulse width modulated signal can reduce the electrical power consumption of the valve, minimise the heat generated in the coils, and proportionally control the force applied to, and therefore position of the armature.

Figure 5B:
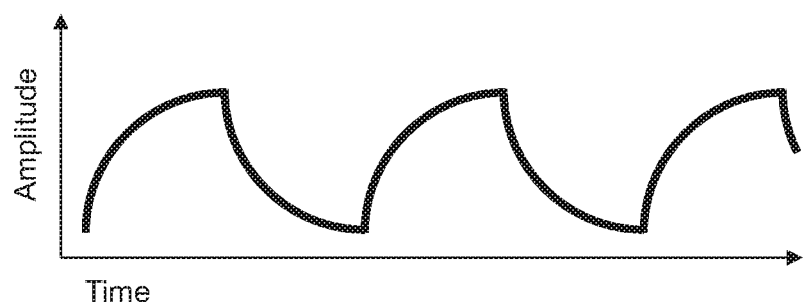
FIG. 5B is a plot of amplitude against time of a signal induced in a pick-up solenoid winding.

As the driving winding is magnetically coupled to the pick-up winding via the armature 403, a signal is induced in the pick-up winding in response to the driving signal. This induced signal is shown in FIG. 5B. The induced signal shown in FIG. 5B and the driving signal shown in FIG. 5A are cotemporaneous i.e. they share the same time axis.

The mark to space ratio of the driving signal is used by the EEC to determine the force applied to the armature. The position of the solenoid valve can be determined based on an amplitude of the signal induced in the pick-up winding. The amplitude may be used as a raw value, or so as to calculate an area under the curve defining the induced signal and the ratio of this area to the area under the driving signal is used to determine the position of the armature. When calculating the area under the respective curves, the EEC may be configured to start and stop the integrations at the same time. For example, when the driving signal is a pulse width modulated signal, the rising edge of the driving signal may be the start trigger, and the falling edge may be the stop trigger.

Advantageously, such an EEC negates the need for a discrete position sensor to be coupled with the solenoid valve. Moreover, the solenoid valve does not need to be augmented, and so no mass is added. Further, as discussed previously, the wiring complexity is reduced as only four leads are required for the solenoid valve. This also reduces the risk of leakage from the solenoid valve. Additionally, there is no need for a discrete measurement electronics block (with the associated grounding and wiring concerns) and instead a single drive block can be provided. Further, such an EEC removes the failure modes associated with additional electrical connectors.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An electronic engine controller (EEC) for a gas turbine engine, wherein the electronic engine controller:
   is configured to connect to a solenoid valve, the solenoid valve comprising:
      a first solenoid winding;
      a second solenoid winding; and
      an armature, wherein the armature is configured to magnetically couple the first solenoid winding to the second solenoid winding; and
   is configured to control the solenoid valve by applying a driving signal to either the first solenoid winding or the second solenoid winding of the solenoid valve via only four leads, wherein a first pair of the four leads connect the first solenoid winding to the EEC and a second pair of the four leads connect the second solenoid winding to the EEC, is configured to use at least a mark-to-space ratio of the driving signal to determine a force applied to the armature, wherein the armature is movable under the action of the driving signal to operate the solenoid valve and movement of the armature is based on the force applied to the armature by the driving signal;

wherein the solenoid winding of the first and second solenoid windings provided with the driving signal is a driving winding and the other solenoid winding of the first and second solenoid windings is a pick-up winding;

is configured to control the solenoid valve by sending the driving signal to the driving winding via the first pair of leads of the four leads and is configured to sense an amplitude of a signal induced in the pick-up winding via the second pair of leads, wherein the signal induced in the pick-up winding is based on the magnetic coupling from the armature; and is configured to sense a position of the solenoid valve based on a comparison between:
 a first area under an amplitude of the driving signal provided to the driving winding based on an integration of the amplitude of the driving signal; and
 a second area under the sensed amplitude of the signal induced in the pick-up winding based on an integration of the sensed amplitude from the pick-up winding,
 wherein the comparison between the first area and the second area comprises a determination of a ratio between the first area and the second area, and
 wherein the EEC is configured to start and stop integrations of the first area and the second area at a same time.

2. The electronic engine controller of claim 1, wherein the electronic engine controller is configured to control the driving winding via a pulse width modulated driving signal.

3. The electronic engine controller of claim 1, wherein the electronic engine controller is a full authority digital engine controller (FADEC).

4. The electronic engine controller of claim 1, wherein the electronic engine controller is configured to control the driving winding via a square-wave driving signal defined in part by the mark-to-space ratio.

5. The electronic engine controller of claim 1, wherein the solenoid valve is configured to control a flow of fuel into a combustion chamber of the gas turbine engine.

6. A gas turbine engine for an aircraft, the gas turbine engine comprising an electronic engine controller (EEC), wherein the electronic engine controller:

is configured to connect to a solenoid valve, the solenoid valve comprising:
 a first solenoid winding;
 a second solenoid winding; and
 an armature, wherein the armature:
  is configured to magnetically couple the first solenoid winding to the second solenoid winding; and is configured to control the solenoid valve by applying a driving signal to either the first solenoid winding or the second solenoid winding of the solenoid valve via only four leads, wherein a first pair of the four leads connect the first solenoid winding to the EEC and a second pair of the four leads connect the second solenoid winding to the EEC, is configured to use at least a mark-to-space ratio of the driving signal to determine a force applied to the armature wherein the armature is movable under the action of the driving signal to operate the solenoid valve and movement of the armature is based on the force applied to the armature by the driving signal, wherein the solenoid winding of the first and second solenoid windings provided with the driving signal is a driving winding and the other solenoid winding of the first and second solenoid windings is a pick-up winding;

is configured to control the solenoid valve by sending the driving signal to the driving winding via the first pair of leads of the four leads and is configured to sense an amplitude of a signal induced in the pick-up winding via the second pair of leads, wherein the signal induced in the pick-up winding is based on the magnetic coupling from the armature; and is configured to sense a position of the solenoid valve based on a comparison between:
 a first area under an amplitude of the driving signal provided to the driving winding based on an integration of the amplitude of the driving signal; and
 a second area under the sensed amplitude of the signal induced in the pick-up winding based on an integration of the sensed amplitude from the pick-up winding,
 wherein the comparison between the first area and the second area comprises a determination of a ratio between the first area and the second area, and
 wherein the EEC is configured to start and stop integrations of the first area and the second area at a same time.

7. The gas turbine engine of claim 6, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

8. The gas turbine engine according to claim 7, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

9. A method of controlling a solenoid valve in a gas turbine engine by an electronic engine controller (EEC), the solenoid valve including a first solenoid winding and a second solenoid winding which are magnetically coupled to one another by an armature of the solenoid valve, the method comprising the steps of:
providing, to one of the first solenoid winding or the second solenoid winding, a driving signal to move the armature and thereby operate the solenoid valve; and
sensing, from a signal induced in the other winding of the first solenoid winding and the second solenoid winding by the magnetic coupling, the position of the armature, wherein sensing the position of the solenoid valve comprises:
 determining, by the EEC, a force applied to the armature based on at least a first area under an amplitude of the driving signal, which is based on at least a mark-to-space ratio of the driving signal, wherein movement of the armature depends on the force applied to the armature by the driving signal, wherein determining the first area under the amplitude of the driving signal comprises integrating by the EEC, the amplitude of the driving signal, comparing, by the EEC the first area under the curve to a second area under an amplitude of the sensed signal induced in the other winding, wherein determining the second area comprises integrating, by the EEC, the amplitude of the sensed signal, wherein comparing the first area the second area comprises determining, by the EEC, a ratio of the first area to the second area, determining, by the EEC the position of the solenoid based on the ratio of the first area to the second area.

\* \* \* \* \*